Jan. 20, 1959  G. E. BAKER  2,870,407
METHOD OF PEAK CURRENT MEASUREMENT
Filed Oct. 6, 1954  2 Sheets-Sheet 1

INVENTOR:
George E. Baker
BY

INVENTOR:
George E. Baker

United States Patent Office 2,870,407
Patented Jan. 20, 1959

2,870,407

METHOD OF PEAK CURRENT MEASUREMENT

George E. Baker, Albuquerque, N. Mex., assignor, by mesne assignments, to the United States of America as represented by the United States Atomic Energy Commission Application October 6, 1954, Serial No. 460,779

1 Claim. (Cl. 324—103)

This invention relates to the measurement and recording of electrical currents and more particularly to the measurement and recording of peak electrical currents.

There has long been a need for a method of measuring and recording large peak electrical currents without breaking the conductor of the current. For example, it is often desirable to know the current in a tower leg of a power transmission line when it is struck by lightning. In the prior art several methods have been devised which make use of the magnetic field surrounding the conductor at the time of current flow to magnetize a piece of iron located within the field. Since the degree of magnetization is proportional to the magnitude of the current, a measurement of the magnetization will indicate the size of the current. A disadvantage of this method, however, is that a plurality of unidirectional current surges causes a degree of magnetization in proportion to the total, giving the indication of a single peak current greater than any which actually occurred.

It is an object of this invention, therefore, to provide a method of measuring and recording the peak current surge of a series of unidirectional surges.

A further disadvantage of the prior art is that alternating current cannot be measured unless the surges in one direction are greater than those in the opposite and the number of the surges is known.

Accordingly another object of this invention is to provide a method of measuring and recording the peak surge of a series of current surges alternating in direction regardless of their comparative amplitudes.

Another object of this invention is to provide a method of measuring and recording peak current surges with greater sensitivity and greater range than methods of the prior art.

Another object of this invention is to provide a method of measuring and recording peak current surges that is relatively insensitive to radioactive radiation, vibration and heat.

Other objects and a better understanding of the invention may be clear after reading the description and claim to follow and by examining the accompanying drawings in which:

In all figures like numerals designate like elements.

Figure 1:
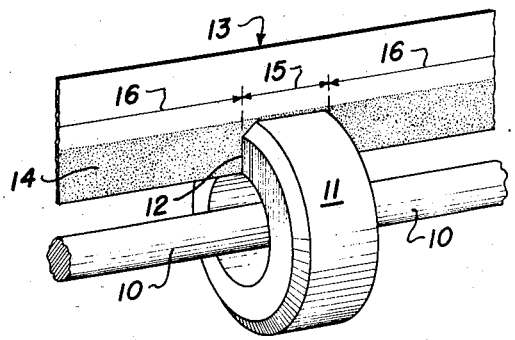
Fig. 1 shows one embodiment of the current detector and recorder.

In Fig. 1, conductor 10 carries the current to be measured. Iron core 11 is concentric with conductor 10 and contains radial slot 12. Magnetic tape 13 is supported within slot 12 and at a fixed distance from conductor 10 by means not shown. Shaded area 14 is the part of tape 13 upon which a signal, preferably of constant frequency and amplitude, is magnetically recorded, preferably to the extent of saturation of tape 13. As current flows in conductor 10, the generated magnetic field is concentrated in core 11, causing partial or complete erasure of the recorded signal on the portion 15 of tape 13 within slot 12. If the signal on portion 15 is completely erased, partial erasure of the recorded signal on the portion 16 of tape 13 without slot 12 will occur. In either case, percentage erasure of the signal is determined by reproducing the remaining signal and comparing its amplitude with that of an unerased portion of the tape.

Figure 3:
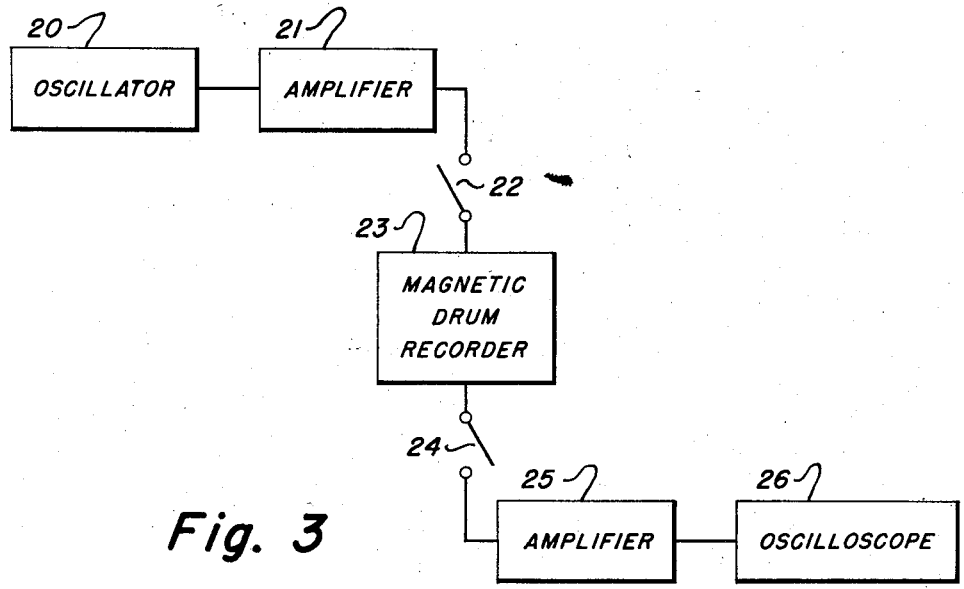
Fig. 3 is a block diagram of a suggested system for recording the signal on magnetic recording tape and for playing back the signal.

The apparatus shown by block diagram in Fig. 3 is a suggested arrangement to be used in recording and reproducing the high-frequency signal whose erasure is an indication of current flow through the detector and recorder. Other types of well-known arrangements could be used instead. For instance, the signal could be recorded by any standard tape recorder, and the partially erased signal reproduced by a playback system for transient signals. Referring to Fig. 3, oscillator 20 produces a high-frequency sine wave which is amplified by amplifier 21, and (when switch 22 is closed) is conducted to a recording head of magnetic drum recorder 23. Switch 24 may remain open during the recording process. A strip of magnetic recording tape is fastened to the magnetic drum recorder so that its length will pass beneath the recording head when the drum rotates and the oscillatory signal will be recorded on the tape. Thus, it is seen that the drum recorder is not used in its usual sense, but is used to carry the tape for recording directly thereon.

The tape is then removed from the drum and placed in the current detector and recorder as shown in Fig. 1. After the flow of current in conductor 10, the tape is removed from the instrument and refastened to magnetic drum recorder 23 so that its length will pass beneath a playback head when the drum rotates. Switch 22 is open and switch 24 is closed during the playback operation. The drum is then rotated and the remaining signal on the strip of magnetic recording tape is reproduced, amplified by amplifier 25, and displayed on the screen of oscilloscope 26.

Figure 2:
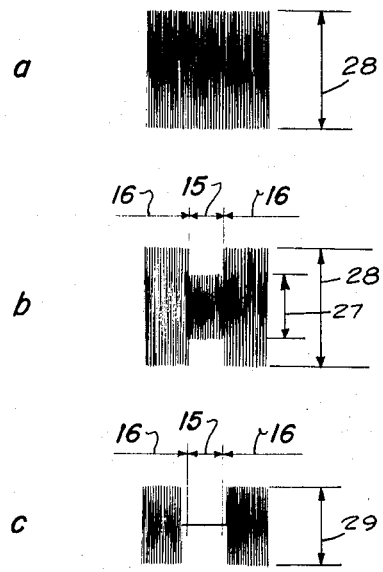
Fig. 2 shows the signal recorded upon a strip of magnetic recording tape as it appears when reproduced by playback means and observed on the screen of an oscilloscope before and after passage of current through the detector and recorder.

The sweep of the oscilloscope beam must be synchronized with the rotation of the drum recorder and adjusted so that the particular portion of the tape recording of interest can be viewed. Diagram *a* of Fig. 2 shows a typical oscilloscope presentation of an unerased portion of the recorded signal. Diagram *b* shows the signal after partial erasure of portion 15 within slot 12 (see Fig. 1) due to a small current. Diagram *c* shows the signal after complete erasure of portion 15 within slot 12 and partial erasure of portion 16 outside of slot 12, all due to a relatively large current.

The percentage of erasure may be determined by visual comparison of the signal amplitudes of the partially erased and unerased portions of the tape. For this reason, it is convenient to retain a portion of the original tape recording for reference purposes without its being subjected to the erasing action of the current detector and recorder. As before mentioned, diagram *a* of Fig. 2 is indicative of the oscillogram presented by the playback of such a tape. If it is desired to determine the peak current flow which caused the partial erasure shown in diagram *b*, the amplitude 27 is measured and subtracted from the amplitude 28 of the unerased signal. The ratio of the difference obtained to the amplitude 28, multiplied by 100, is the percentage erasure.

Figure 4:
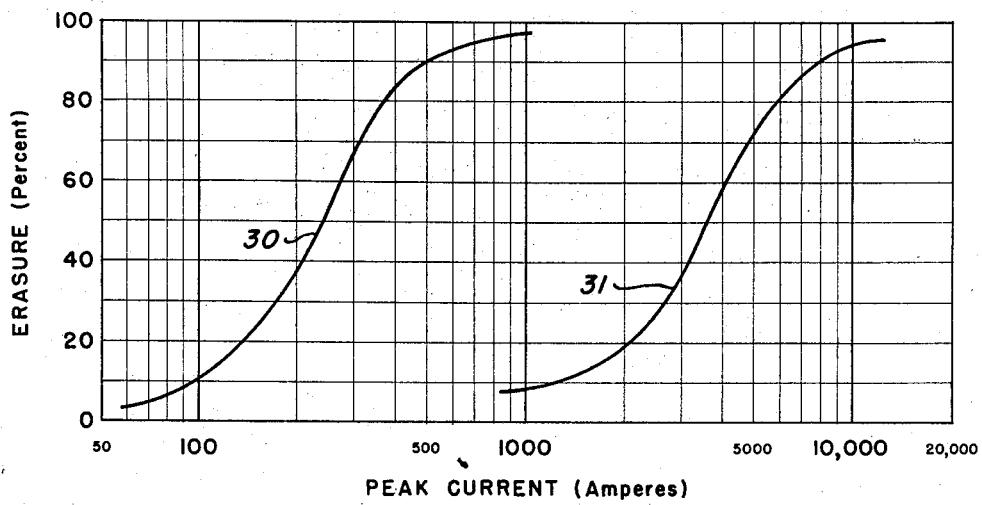
Fig. 4 shows calibration curves for the current detector and recorder, obtained by passing unidirectional pulses through the instrument.

The curves of Fig. 4 are now used to determine the peak current flow when the percentage erasure is known.

Curve 30 is a plot of percentage erasure created within core 11 of Fig. 1 by single unidirectional current pulses flowing in conductor 10. Within certain limitations to be mentioned later, the peak current may be read from the curve at a point corresponding to the percentage erasure created within core 11.

The same procedure is used if it is desired to determine the peak current flow which caused the partial erasure of portion 16 of the signal shown in diagram c of Fig. 2. Amplitude 29 is compared with unerased amplitude 28 to obtain a figure for percentage erasure which is then applied to curve 31 of Fig. 4 to obtain the value of the peak current flow. Curve 31 was obtained in the same manner as curve 30, only by observing percentage erasure outside of core 11 of Fig. 1 instead of inside it.

It has been found that the curves of Fig. 4, although obtained by passing a single unidirectional pulse through the current detector for each value of current plotted, are applicable also to currents having a succession of unidirectional pulses or alternating pulses in which the maximum pulse in either direction is at least twice the amplitude of any of the others. In some instances, the magnitudes of unknown currents are of interest if they can be determined within 60% of their actual values. The calibration curves can be used in such cases for measurement of any type of current waveform, giving readings equal to or up to 60% greater than the actual peak current. For instance, it has been determined that the indicated peak of a sine-wave current will be 1.6 times the actual peak, using the curves of Fig. 4.

If the shape of the current waveform to be measured is known, more accurate indications may be obtained by determining a correction factor to be applied to the curves shown. This is done by passing two currents of the waveform and of different known magnitudes through the current detector and recorder and recording each peak current on a separate tape. These tapes are played back and the percentage erasure determined so that two new points may be plotted in Fig. 4. These points will determine the new location of the applicable curve along the current axis. Later measurements of current peaks of that waveform then may be made with greater accuracy.

In the preferred embodiment described, the recorded signal is a sine wave having a frequency of 1250 cycles per second. The spacing between conductor 10 and magnetic tape 13 is such that currents between 60 and 1000 amperes are measured and recorded on portion 15 of tape 13 within iron core 11, and currents between 900 and 12,000 amperes are measured and recorded on portion 16 of tape 13 without iron core 11.

From the foregoing description it will be clear that an inexpensive method, relatively insensitive to radioactive radiation, vibration and heat, is provided for measuring peak currents of any magnitude or waveform. While certain preferred arrangements and values have been mentioned as examples in connection with the foregoing description, it will be obvious to those skilled in the art that departures from these may be made without departing from the sphere and scope of the invention as described in the apppended claim.

I claim:

The method of measuring the peak electrical current flowing in a conductor comprising steps of recording an alternating constant frequency and amplitude signal on a magnetic recording medium to the extent of saturation of the medium, concentrating a portion of the flux of the current carrying conductor into a magnetic path of a defined area, subjecting a portion of the magnetic medium to the flux in said path so as to reduce the amplitude of the signal recorded on the portion of the magnetic medium disposed within said flux path and the portion of said magnetic medium immediately adjacent said flux path, playing back the signal recorded on said medium, and comparing the amplitude of the signal from the portion of said magnetic medium immediately adjacent said flux path and the amplitude of the signal from the portion of said magnetic medium within said flux path with the amplitude of the signal from an unerased portion of said magnetic medium to determine the percentage of signal erasure, and thereby obtain the peak value of currents flowing in the conductor.

References Cited in the file of this patent

UNITED STATES PATENTS

| | | |
|---|---|---|
| 1,886,616 | Alverson | Nov. 8, 1932 |
| 2,236,287 | Edgar | Mar. 25, 1941 |
| 2,378,388 | Begun | June 19, 1945 |
| 2,610,257 | Wissmann | Sept. 9, 1952 |
| 2,698,930 | Gutterman | Jan. 4, 1955 |

FOREIGN PATENTS

| | | |
|---|---|---|
| 742,335 | France | Mar. 4, 1933 |
| 887,900 | France | Nov. 25, 1943 |